United States Patent Office 3,446,817
Patented May 27, 1969

3,446,817
WATER-INSOLUBLE ANTHRAQUINONE
DYESTUFFS
Edwin Dennis Harvey and Cyril Eric Vellins, Manchester, England, assignors to Imperial Chemical Industries Limited, London, England, a corporation of Great Britain
No Drawing. Filed Nov. 10, 1966, Ser. No. 593,269
Claims priority, application Great Britain, Nov. 22, 1965, 49,432/65; June 27, 1966, 28,728/66
Int. Cl. C09b 1/16, 1/36
U.S. Cl. 260—326
2 Claims

ABSTRACT OF THE DISCLOSURE

Water-insoluble anthraquinone dyestuffs which contain up to four acylaminomethyleneamino groups, and the use of said dyestuffs for coloring synthetic textile materials.

---

This invention relates to anthraquinone dyestuffs, and more particularly it relates to disperse anthraquinone dyestuffs, and mixtures thereof, which are valuable for colouring synthetic textile materials.

According to the invention there are provided the water-insoluble anthraquinone dyestuffs, and mixtures thereof, which are represented by the formula:

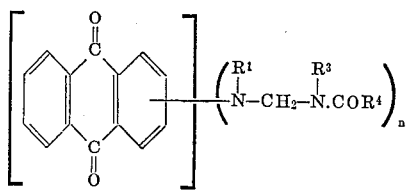

wherein $n$ is an integer of from 1 to 4;

$R^1$ represents a hydrogen atom or a lower alkyl radical;

$R^3$ represents a hydrogen atom or a —CO— group which is joined to $R^4$ to form a 5- or 6-membered nitrogen-containing ring structure which may form part of a fused ring system;

$R^4$ represents a hydrogen atom or a substituted or unsubstituted aliphatic or aryl radical;

each of the

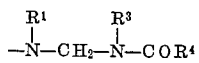

groups being directly attached to a carbon atom of the anthraquinone nucleus which can be further substituted by chlorine, bromine, nitro, hydroxy, lower alkyl, lower alkoxy or —$NHR^1$ groups.

The terms "lower alkyl" and "lower alkoxy" are used to denote alkyl and alkoxy radicals respectively containing from 1 to 4 carbon atoms, and as examples of such radicals there may be mentioned methyl, ethyl, propyl, butyl, methoxy, ethoxy, propoxy and butoxy radicals.

It is preferred that $R^1$ represents a hydrogen atom.

It is also preferred that the

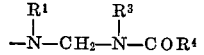

group represents a group of the formula

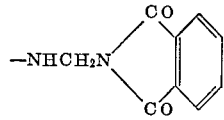

As examples of the 5- or 6-membered nitrogen-containing ring systems formed by joining together $R^4$ and the —CO— group represented by $R^3$ there may be mentioned systems of the following formulae:

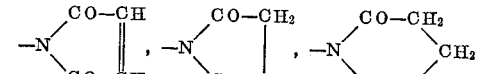

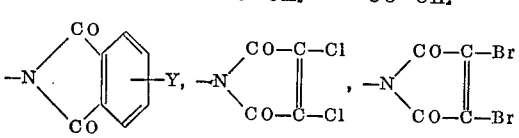

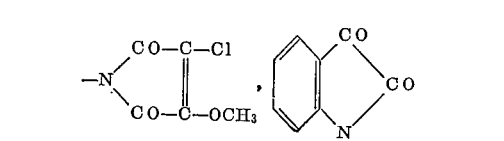

wherein Y represents chlorine, bromine, nitro or lower alkyl.

As examples of the substituted or unsubstituted aryl radicals represented by $R^4$ there may be mentioned substituted or unsubstituted monocyclic aryl radicals such as phenyl, tolyl, chlorophenyl, nitrophenyl, methoxyphenyl and hydroxyphenyl radicals. As examples of the substituted or unsubstituted aliphatic radicals represented by $R^4$ there may be mentioned lower alkyl radicals such as defined above, substituted lower alkyl radicals such as aryl lower alkyl radicals for example benzyl and β-phenylethyl radicals, hydroxy lower alkyl radicals such as β-hydroxyethyl and β- or γ-hydroxypropyl radicals, chloro lower alkyl or bromo lower alkyl radicals such as chloromethyl, bromomethyl, β-chloroethyl, β-bromoethyl, trichloromethyl, α:γ-dichloropropyl, β:γ-dibromopropyl, γ-chloro-β-hydroxypropyl and γ-bromo-β-hydroxypropyl radicals, lower alkoxy lower alkyl radicals such as β-methoxyethyl and β-ethoxyethyl radicals; lower alkenyl radicals such as vinyl, α- or β-methylvinyl and but-2- or 3-enyl radicals, and substituted lower alkenyl radicals such as chloro or bromo-lower alkenyl radicals for example α-chlorovinyl, β-bromovinyl, β-chlorovinyl, β:β-dichlorovinyl and α:β:β-trichlorovinyl radicals.

According to a further feature of the invention, there is provided a process for the manufacture of the water-insoluble anthraquinone dyestuffs, and mixtures thereof, as hereinbefore defined, which comprises reacting together in the presence of sulphuric acid, phosphoric acid or an organic liquid, an anthraquinone compound or mixture of anthraquinone compounds of the formula:

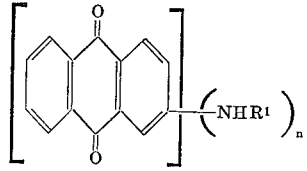

Formula I wherein $R^1$ and $n$ have the meanings stated, and the anthraquinone nucleus may contain further substituents, with at least one molecular proportion of a compound, or mixture of compounds, of the formula:

Formula II wherein $R^3$ and $R^4$ have the meanings stated, and X represents a chlorine or a bromine atom or a hydroxyl group or the corresponding ethers.

The process of the invention may be conveniently brought about by stirring the compounds of Formulae I and II together in sulphuric acid, phosphoric acid or an organic liquid, preferably at a temperature between 0° and 60° C. when the reaction is being carried out in sulphuric acid or phosphoric acid, or at temperatures between 0° and 150° C. when an organic liquid is being used. The dyestuff or dyestuff mixture so obtained can then be isolated by conventional methods, for example by pouring the sulphuric acid or phosphoric acid reaction medium onto ice and filtering off the precipitated dyestuff, or by steam-distilling off the organic liquid and again filtering off the precipitated dyestuff.

As examples of organic liquids which can be used in the process of the invention there may be mentioned ethanol, β-ethoxyethanol, acetone, chlorobenzene, nitrobenzene, o-dichlorobenzene acetic acid, propanol, butanol or pyridine. When the reaction is being carried out in an organic liquid then it is sometimes found desirable to add an acid catalyst such as aluminium chloride or zinc chloride.

When using a compound of Formula II wherein $R^4$ is an aliphatic radical substituted by a chlorine or a bromine atom then it is preferred, in order to obviate side reactions, to carry out the reaction in phosphoric acid or sulphuric acid.

As examples of the anthraquinone compounds of Formula I which can be used in the process of the invention there may be mentioned:

1:4-diaminoanthraquinone,
1-amino-4-hydroxyanthraquinone,
1:5-diamino-4:8-dihydroxyanthraquinone,
1-methylamino-4-hydroxyanthraquinone,
1:8-diamino-4:5-dihydroxyanthraquinone,
1-hydroxy-2-(chloro- or bromo-)4-aminoanthraquinone,
1:4-diamino-5-nitroanthraquinone,
1-amine-4-methoxyanthraquinone,
1- or 2-aminoanthraquinone,
1-amino-2-methylanthraquinone,
1-amino-4-bromoanthraquinone,
1-amino-2:4-dibromoanthraquinone,
1:5- or 1:8-diaminoanthraquinone,
1:4:5:8-tetraaminoanthraquinone,
1:4-diamine-5:8-dihydroxyanthraquinone,
1-amino-4:5:8-trihydroxyanthraquinone,
1-amino-2-methoxy-4-hydroxyanthraquinone,
1-amino-2-β-hydroxyethoxy-4-hydroxyanthraquinone,
1-amino-2-methyl-4-bromoanthraquinone,
1-aminoanthraquinone-2-carboxylic acid,
2-amino-3-hydroxyanthraquinone,
1:4-diamino-2:3-dichloroanthraquinone,
1-bromo-4-methylaminoanthraquinone,
1-chlor-5-aminoanthraquinone,
2-chlor-3-aminoanthraquinone,
1:8-dinitro-4,5-diaminoanthraquinone,
1-amino-2-methoxy-4-methylaminoanthraquinone,
1:4:5-triaminoanthraquinone,
1:5-diamino-2-methylanthraquinone,
1:8-diamino-2-methylanthraquinone.

As examples of the compounds of Formula II which can be used in the process of the invention there may be mentioned N-methylolacetamide,
N-methylol-chloroacetamide,
N-methylolphthalimide,
N-methylolsuccinimide,
N-chloromethylphthalimide,
N-methylolbenzamide,
N-bromomethylphthalimide,
N-methylol-trichloroacetamide,
N-methylol-(5-nitro- or chloro-)phthalimide,
N-methylolmaleimide,
N-methylol(chlor or bromo)maleimide,
N-methylolisatin,
N-methylolacrylamide,
N-methylol 2:4-dichlorobenzamide,
N-chloromethylmaleimide,
dimethylolurea,
N-methylolmethacrylamide,
N-chloromethylformamide,
N-methylolformamide and
N-methyl-N-methylolacetamide.

When the process of the invention is carried out in sulphuric acid medium then, if desired, the compounds of Formula II wherein X represents a hydroxyl group can be replaced by equimolecular proportions of formaldehyde and an amide or cyclic imide of the formula:

wherein $R^3$ and $R^4$ have the meanings stated. When the process of the invention is being carried out in sulphuric acid medium it is sometimes found advantageous to also have some boric acid present. When starting from an anthraquinone compound which contains two or more —$NHR^1$ groups it is usually found that a mixture of products is obtained comprising the anthraquinone dyestuffs of the invention wherein each of the —$NHR^1$ groups has been converted to a

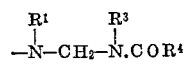

group, and anthraquinone dyestuffs of the invention wherein only part of the —$NHR^1$ groups have been converted to

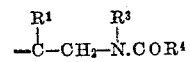

groups, together with some unreacted anthraquinone compound of Formula I.

According to a further feature of the invention there is provided an alternative process for the manufacture of the anthraquinone dyestuffs of the invention wherein the anthraquinone nucleus is substituted by at least one chlorine or bromine atom which comprises treating with a chlorinating or brominating agent a water-insoluble anthraquinone dyestuff, or mixture thereof, which is represented by the formula:

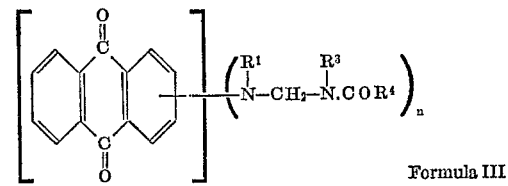

Formula III wherein $R^1$, $R^3$, $R^4$ and $n$ have the meanings stated.

This alternative process of the invention can be conveniently brought about by stirring the anthraquinone dyestuff of Formula III and the chlorinating or brominating agent together in sulphuric acid, preferably at a temperature between 0° and 60° C., and in the presence of a halogenation catalyst such as iodine. The resulting chlorinated or brominated dyestuff can be isolated by conventional methods.

If desired this alternative process can be effected without intermediate isolation of the anthraquinone dyestuff of Formula III, and this can be conveniently brought about by reacting the appropriate anthraquinone compound of Formula I with the appropriate compound of Formula II in sulphuric acid medium to obtain the required anthraquinone dyestuff of Formula III, adding the chlorinating or brominating agent and the halogenation catalyst, and stirring the resulting mixture, preferably at a temperature between 0° and 60° C., to effect the chloroination or bromination.

As examples of the said chlorinating or brominating agents there may be mentioned chlorine and bromine.

A preferred class of the water-insoluble anthraquinone dyestuffs of the invention comprises the anthraquinone dyestuffs, and mixtures thereof, which are represented by the formula:

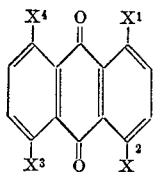

wherein one or two of the groups represented by $X^1$, $X^2$, $X^3$ and $X^4$ are

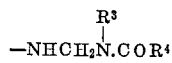

groups, $R^3$ and $R^4$ having the meanings stated above, and the remaining groups represented by $X^1$, $X^2$, $X^3$ and $X^4$ are hydroxy or amino groups.

The water-insoluble anthraquinone dyestuffs and mixtures thereof, as hereinbefore defined, are valuable for dyeing textile materials comprising synthetic fibres, for example polyamides such as polyhexamethylene adipamide, cellulose esters such as secondary cellulose acetate and cellulose triacetate, polymers and copolymers of acrylonitrile such as polyacrylonitrile, polyolefines such as polypropylene, and particularly polyesters such as polyethylene terephthalate. For dyeing such textile materials it is preferred to use the water-insoluble anthraquinone dyestuffs in a finely dispersed form which may be obtained by milling the dyestuffs with water and a dispersing agent, for example the sodium salt of a formaldehyde naphthalene sulphonic acid condensate. If desired, the so-obtained dispersed aqueous paste of the dyestuff may be dried to form a re-dispersible powder which may be obtained in a non-dusting form by any of the procedures known for forming non-dusting powders.

Such textiles can conveniently be coloured with the anthraquinone dyestuffs, as hereinbefore defined, by immersing the textile material in a dyebath comprising an aqueous dispersion of one or more of the said dyestuffs, which dyebath preferably contains a non-ionic, cationic and/or anionic surface-active agent, and thereafter heating the dyebath for a period at a suitable temperature. In the case of secondary cellulose acetate textile materials it is preferred to carry out the dyeing process at a temperature between 60° and 85° C.; in the case of cellulose triacetate or polyamide textile material it is preferred to carry out the dyeing process at 95° to 100° C.; in the case of aromatic polyester textile materials the dyeing can either be carried out at a temperature between 90° and 100° C., preferably in the presence of a carrier such as diphenyl or o-hydroxydiphenyl, or at a temperature above 100° C., preferably at a temperature between 120° and 140° C., under superatmospheric pressure.

Alternatively the aqueous dispersion of the said anthraquinone dyestuff can be applied to the textile material by a padding or printing process, followed by steaming of the textile material or by heating up to temperatures of 230° C. In such processes it is preferred to incorporate a thickening agent, such as gum tragacanth, gum arabic or sodium alginate, into the aqueous dispersion of the said anthraquinone dyestuff.

At the conclusion of the colouring process it is preferred to give the coloured textile material a rinse in water or a brief soaping treatment before finally drying the coloured textile material. In the case of aromatic polyester textile materials it is also preferred to subject the coloured textile material to a treatment in an alkaline aqueous solution of sodium hydrosulphite before the soaping treatment in order to remove loosely attached dyestuff from the surface of the textile material.

The water-insoluble anthraquinone dyestuffs, as hereinbefore defined, have very good affinity (i.e. build-up) for textile materials comprising polyester fibers, on which they have excellent fastness properties, for example to washing, steam-pleating, sublimation at high temperatures, and to light.

It is sometimes advantageous to use the water-insoluble anthraquinone dyestuffs in the form of mixtures with each other or with other water-insoluble dyestuffs, particularly of the azo or anthraquinone series. By this means the building-up properties of the dyes on polyester fibres are improved.

Those water-insoluble anthraquinone dyestuffs and mixtures thereof of the invention wherein $R^4$ represents a radical containing a reactive chlorine or bromine atom or a reactive group (that is to say a reactive atom or group which is capable of reacting with amino groups present in textile materials so that the said dyestuffs become attached to the textile material through a covalent chemical bond) are of particular value for colouring synthetic nitrogen-containing textile materials, such as synthetic polyamide or polyurethane textile materials. Such dyestuffs are preferably applied to the said textile materials from a dyebath having an initial pH below 7, preferably a pH between 2 and 7, and after the textile material has absorbed some or all of the dyestuff present in the dyebath, the pH of the dyebath is raised by the addition of an alkali or an alkaline salt, preferably to a pH above 7.

The resulting dyeings have excellent fastness to the wet treatments normally applied to such textile materials.

The invention is illustrated but not limited by the following examples in which the parts and percentages are by weight.

Example 1

2 parts of N-methylolphthalimide are added to a solution of 2.7 parts of 1:5-dihydroxy-4:8-diaminoanthraquinone, in 10 parts of 96% sulphuric acid at a temperature between 5° and 10° C., and the resulting mixture is stirred for 18 hours at the same temperature. The mixture is then poured into a mixture of ice and water, and the precipitated dyestuff is filtered off, washed with water and dried.

The resulting dyestuff consists essentially of a mixture of 1:5 - dihydroxy-4-amino-8-(phthalimidomethylamino) anthraquinone and 1:5 - dihydroxy-4:8-di(phthalimidomethylamino)anthraquinone together with some unreacted 1:5-dihydroxy-4:8-diaminoanthraquinone.

When dispersed in aqueous medium the dyestuff so obtained dyes polyester textile materials in deep blue shades having excellent fastness to light and to dry heat treatments.

Example 2

A mixture of 13.5 parts of boric acid, 27 parts of 1:5-dihydroxy-4:8-diaminoanthraquinone and 100 parts of 96% sulphuric acid is stirred for 1 hour at 20° C. 80 parts of N-methylolphthalimide are added gradually over 3 hours, and the resulting mixture is stirred for 24 hours at 25° to 30° C. The mixture is then poured into a mixture of ice and water, and the precipitated dyestuff is filtered off, washed with water and dried.

The resulting dyestuff consists essentially of 1:5-dihydroxy - 4:8 - di(phthalimidomethylamino)anthraquinone together with a small amount of 1:5-dihydroxy-4-amino-8-(phthalimidomethylamino)anthraquinone and 1:5-dihydroxy-4:8-diaminoanthraquinone.

When dispersed in aqueous medium the dyestuff so obtained dyes polyester textile materials in blue shades possessing excellent fastness to light and to dry heat treatments.

Example 3

In place of the 2.7 parts of 1:5-dihydroxy-4:8-diaminoanthraquinone used in Example 1 there are used 2.7 parts of 1:8-dihydroxy-4:5-diaminoanthraquinone or 2.7 parts of a mixture of 1:8-dihydroxy-2:5-diaminoanthraquinone and 1:8-dihydroxy-4:5-diaminoanthraquinone, whereby dyestuffs are obtained having excellent affinity for polyester textile materials which they dye in greenish-blue and black shades respectively.

Example 4

A mixture of 3 parts of phthalimide, 2 parts of a 36.6% aqueous solution of formaldehyde and 11 parts of 96% sulphuric acid is stirred for 1 hour at 20° C. 2.7 parts of 1:5-dihydroxy-4:8-diaminoanthraquinone are added and the mixture is stirred for 36 hours at 20° C. The mixture is poured into a mixture of ice and water and the precipitated dyestuff is filtered off, washed with water and dried.

The resulting dyestuff consists essentially of a mixture of 1:5 - dihydroxy-4-amino-8-(phthalimidomethylamino) anthraquinone and 1:5 - dihydroxy - 4:8 - di(phthalimidomethylamino)anthraquinone together with some unreacted 1:5-dihydroxy-4:8-diaminoanthraquinone.

When dispersed in aqueous medium the resulting dyestuff has excellent affinity for polyester textile materials which it dyes in blue shades having excellent fastness to light and to dry heat treatments.

The following table gives further examples of the anthraquinone dyestuffs of the invention which are obtained by reacting the anthraquinone compounds listed in the second column of the table with the N-methylol compounds listed in the third column of the table, the moles of the N-methylol compounds used per mole of the anthraquinone compounds being listed in the fourth column of the table, and the reaction being carried out in the medium listed in the fifth column of the table, by methods similar to those described in the preceding examples. The sixth column of the table indicates the shades obtained from the resulting dyestuffs on polyester textile materials.

Example 40

A mixture of 13.5 parts of 1:5-dihydroxy-4:8-diaminoanthraquinone, 10 parts of N-methylolphthalimide and 60 parts of sulphuric acid monohydrate is stirred for 18 hours at 20° C. 0.1 part of iodine and 0.7 part of bromine are then added, and the mixture is stirred for 18 hours at 55° C. to 60° C. The mixture is then cooled to 10° C. poured into a mixture of ice and water, and the precipitated dyestuff is filtered off, washed with water and dried.

When dispersed in aqueous medium the dyestuff so obtained dyes polyethylene terephthalate textile materials in deep blue shades possessing excellent fastness to light and to dry heat treatments.

Example 41

A mixture of 13.5 parts of 1:5-dihydroxy-4:8-diaminoanthraquinone, 5 parts of boric acid and 45 parts of sulphuric acid monohydrate is stirred for 1 hour at 20° C. 10 parts of N-methylolphthalimide are then added and the mixture is stirred for 18 hours at 20° to 25° C. 0.1 part of iodine and 0.85 part of bromine are then added, and the mixture is stirred for 18 hours at 55° to 60° C. The mixture is then cooled to 10° C., poured into a mixture of ice and water, and the precipitated dyestuff is filtered off, washed with water and dried.

When dispersed in aqueous medium the dyestuff so obtained has excellent affinity for polyethylene terephthalate textile materials which it dyes in blue shades possessing excellent fastness to light and to dry heat treatments.

| Example | Anthraquinone compound | N-methylol compound | Moles of the N-methylol compound | Reaction medium | Shade |
|---|---|---|---|---|---|
| 5 | 1:5-dihydroxy-4:8-diaminoanthraquinone. | N-methylolacrylamide | 3 | 96% sulphuric acid | Blue. |
| 6 | do | N-bromomethylphthalimide | 2.2 | do | Do. |
| 7 | 1-amino-4-hydroxyanthraquinone | do | 1.5 | do | Red. |
| 8 | 1-hydroxy-2-bromo-4-aminoanthraquinone. | do | 1.5 | do | Bluish-red. |
| 9 | 1:4-diaminoanthraquinone | do | 3 | 5% oleum | Violet. |
| 10 | 1:4-diamino-5-nitroanthraquinone | do | 3 | 96% sulphuric acid | Do. |
| 11 | 1-amino-4-methoxyanthraquinone | do | 1.5 | do | Red. |
| 12 | 1-aminoanthraquinone | do | 1.5 | Pyridine | Yellow. |
| 13 | 1:5-dihydroxy-4:8-diaminoanthraquinone. | do | 3 | Nitrobenzene (containing aluminium chloride as a catalyst). | Blue. |
| 14 | do | N-methylolformamide | 3 | 96% sulphuric acid | Do. |
| 15 | do | N-methyloltrichloroacetamide | 3 | do | Do. |
| 16 | do | N-methylolbenzamide | 3 | 96% sulphuric acid | Do. |
| 17 | do | N-methylolphthalimide | 3 | Pyridine | Do. |
| 18 | do | do | 3 | β-Ethoxyethanol | Do. |
| 19 | do | N-methylolbenzamide | 3 | Pyridine | Do. |
| 20 | do | 4-nitro-N-methololphthalimide | 3 | 96% sulphuric acid | Do. |
| 21 | do | N-methylolisatin | 3 | Pyridine | Do. |
| 22 | do | do | 3 | β-Ethoxyethanol | Do. |
| 23 | do | N-bromoethylphthalimide | 3 | do | Do. |
| 24 | do | do | 3 | Pyridine | Do. |
| 25 | 1-amino-4-methoxyanthraquinone | N-bromomethylphthalimide | 1.5 | β-Ethoxyethanol | Red. |
| 26 | 1:4-diaminoanthraquinone | do | 3 | do | Violet. |
| 27 | 2-aminoanthraquinone | N-methylolphthalimide | 1.5 | 96% sulphuric acid | Yellow. |
| 28 | do | do | 1.5 | Pyridine | Do. |
| 29 | do | do | 1.5 | β-Ethoxyethanol | Do. |
| 30 | 1:4:5:8-tetraminoanthraquinone | do | 6 | 96% sulphuric acid | Blue. |
| 31 | Monobromo-1:5-dihydroxy-4:8-diaminoanthraquinone. | do | 3 | do | Do. |
| 32 | Dibromo-1:5-dihydroxy-4:8-diaminoanthraquinone. | do | 3 | do | Do. |
| 33 | Mixture of mono- and di-brominated 1:5-dihydroxy-4:8-diaminoanthraquinone. | do | 3 | do | Do. |
| 34 | 1:5-dihydroxy-4:8-di(methylamino) anthraquinone. | do | 3 | do | Do. |
| 35 | 1-amino-4-hydroxyanthraquinone | N-methylolsuccinimide | 1.5 | β-Ethoxyethanol | Red. |
| 36 | 1:4-di(methylamino)-anthraquinone | N-methylolphthalimide | 3 | Pyridine | Blue. |
| 37 | 1:5-dihydroxy-4:8-diaminoanthraquinone. | N-methylolmaleimide | 3 | 96% sulphuric acid | Do. |
| 38 | 1-amino-4-hydroxyanthraquinone | N-methylolacetamide | 1.5 | do | Red. |
| 39 | 1-hydroxy-2-chloro-4-aminoanthraquinone. | N-methylolphthalimide | 1.5 | do | Do. |

We claim:
1. Water-insoluble anthraquinone dyestuffs and mixtures thereof having the formula

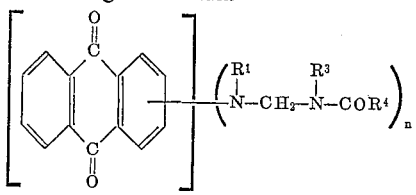

wherein $n$ is an integer of from 1 to 4;
$R^1$ is selected from the class consisting of hydrogen and lower alkyl;
$R^3$ is selected from the class consisting of hydrogen and a —CO— group which is joined to $R^4$ to form a ring system selected from the class consisting of

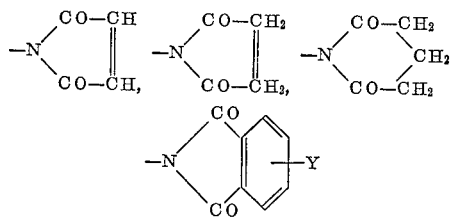

wherein Y represents a member selected from the group consisting of chlorine, bromine, nitro and lower alkyl having 1 to 4 carbon atoms;

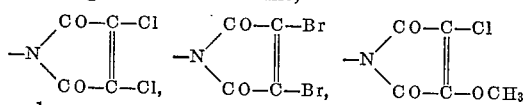

and

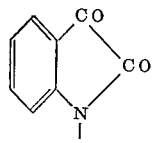

$R^4$ is selected from the class consisting of hydrogen, phenyl, chlorophenyl, nitrophenyl, methoxyphenyl, lower alkyl, lower alkenyl, and chloro lower alkyl; and each of the

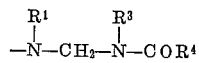

groups is directly attached to a carbon atom of the anthraquinone nucleus which may contain further substituents selected from the class consisting of chlorine, bromine, nitro, hydroxy, lower alkoxy, amino and lower alkylamino.

2. Water-insoluble anthraquinone dyestuffs, and mixtures thereof, as claimed in claim 1 which are represented by the formula:

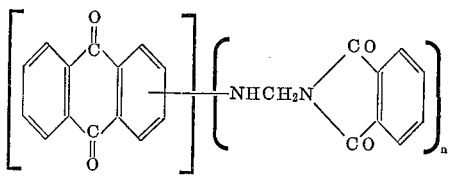

wherein $n$ is an integer of from one to four, and the anthraquinone nucleus may contain further substituents selected from the class consisting of chlorine, bromine, nitro, hydroxy, lower alkoxy and amino.

References Cited
UNITED STATES PATENTS 3,316,280   4/1967   Vollmann et al. _____ 260—381

ALEX MAZEL, *Primary Examiner.*

J. A. NARCAVAGE, *Assistant Examiner.*

U.S. Cl. X.R.

8—39; 260—281, 325, 326.5, 377